United States Patent
Rasmussen (12)

(10) Patent No.: US 11,761,542 B2
(45) Date of Patent: Sep. 19, 2023

(54) NON-PUSHER SEAL WITH SEALING ELASTOMER AND SYSTEMS UTILIZING SAME

(71) Applicant: John Crane Inc., Chicago, IL (US)

(72) Inventor: Darin Merrill Rasmussen, Palatine, IL (US)

(73) Assignee: JOHN CRANE INC., Chicago, IL (US)

(*) Notice: Subject to any disclaimer, the term of this patent is extended or adjusted under 35 U.S.C. 154(b) by 0 days.

(21) Appl. No.: 17/718,425

(22) Filed: Apr. 12, 2022

(65) Prior Publication Data

US 2022/0333691 A1 Oct. 20, 2022

Related U.S. Application Data

(60) Provisional application No. 63/174,636, filed on Apr. 14, 2021.

(51) Int. Cl.
*F16J 15/34* (2006.01)

(52) U.S. Cl.
CPC .................. *F16J 15/3452* (2013.01)

(58) Field of Classification Search
CPC ...... F16J 15/34; F16J 15/3436; F16J 15/3452; F16J 15/002; F16J 15/006
See application file for complete search history.

(56) References Cited

U.S. PATENT DOCUMENTS

| | | | | |
|---|---|---|---|---|
| 3,941,395 A | * | 3/1976 | Ball | F04D 29/126 277/374 |
| 4,721,311 A | * | 1/1988 | Kakabaker | F16J 15/162 277/408 |
| 5,924,697 A | | 7/1999 | Parker et al. | |
| 5,941,531 A | | 8/1999 | Parker et al. | |
| 2017/0198815 A1 | * | 7/2017 | Yanagisawa | F16J 15/3472 |
| 2018/0017161 A1 | * | 1/2018 | Rasmussen | F16J 15/36 |
| 2019/0331227 A1 | | 10/2019 | Itadani et al. | |
| 2020/0232562 A1 | * | 7/2020 | Rasmussen | F01D 11/003 |

FOREIGN PATENT DOCUMENTS

WO 2021046352 A1 3/2021

OTHER PUBLICATIONS

Notification of Transmittal of the International Search Report and the Written Opinion of the International Searching Authority, or the Declaration; PCT/IB2022/053435; dated Jul. 20, 2022, 14 pages.

* cited by examiner

*Primary Examiner* — Gilbert Y Lee
(74) *Attorney, Agent, or Firm* — CANTOR COLBURN LLP

(57) ABSTRACT

A double seal includes two sliding seals. The seals can be non-pusher secondary seals (NPSS). In one embodiment, by employing an NPSS as the chamber side seal can handle large pressure reversals where the inner diameter pressure (pressure in the chamber) spikes and exceeds the outer diameter pressure that is provided between the two seals forming the double seal.

17 Claims, 6 Drawing Sheets

NON-PUSHER SEAL WITH SEALING ELASTOMER AND SYSTEMS UTILIZING SAME

DOMESTIC PRIORITY

This application claims the benefit of U.S. Provisional Application No. 63/174,636 filed Apr. 14, 2021, which is hereby incorporated herein in its entirety by reference.

FIELD

Exemplary embodiments pertain to the art of seals and, in particular to double seal that includes non-pusher seals arranged to accommodate reverse pressure situations.

BACKGROUND

There are several types of seals that can be used to provide a seal between a rotating shaft and a stationary housing of a pump, compressor, turbine, or other rotating machine. One example is an end face mechanical seal. Such seals includes a seal interface formed of two faces that contact one another. In operation one of the faces rotates with the rotating shaft and the other is held in a fixed position. Frictional wear between the seal faces can cause a gap to form between the two faces leading to excessive leakage. Accordingly, such seals require regular adjustment in order to maintain the appropriate or axial position of the faces relative to one another to account for the wear while still maintaining a relatively leak-free seal. Of course, some leakage can occur regardless of how well the faces are manipulated.

Various biasing mechanisms have been contemplated to provide a closing force to automatically accommodate wear and push the seal faces together. Such biasing mechanism have included single and multiple coil springs, and metal bellows. The skilled artisan will realize that the total closing force is actually a combination of hydraulic force from the sealed fluid and force provided by the biasing mechanism.

If the seal faces are rotated against each other without some form of lubrication, face friction would cause excessive and early failure do to face friction and heat generation. For this reason some form of lubrication is required between the rotary and stationary seal face. In a typical mechanical seal the faces are kept lubricated by the formation of a thin film of fluid between the seal faces. This film can either come from the fluid being pumped/compressed or from an external source.

One type of seal that includes two faces is a so-called "pusher seal." In a pusher seal a dynamic secondary seal (such as an O-ring) is provided to form a seal between the shaft (or an element connected to the shaft) and the face that moves axially relative to the shaft so that fluid cannot bypass the faces and escape. Axial movement of the face can lead to fretting or shredding of the secondary seal due to friction.

Another type of seal employs the use of convoluted elastomer bellows. Instead of an O-ring, this type of seal uses a spring loaded bellows instead of an O-ring. Such seal can sometimes be difficult to implement in high-pressure operating condition.

The rotating seal face is part of a ring sometimes referred to as a "mating ring" as it is mated to the rotating shaft/rotor. The rotating ring can be mated to the rotor via a shaft sleeve. The stationary face is part of a ring referred to as a stationary ring or primary ring and does not rotate during operation. Such a primary ring is allowed, however, to move axially relative to the rotor/shaft.

SUMMARY

Disclosed in one embodiment is a double seal that includes two sliding seals. The seal can provide for situations where an increase in chamber pressure may rise to a level where it would damage a typical seal. As more fully shown below this can be provided by having a chamber side seal of the double seal implemented as a non-pusher seal that includes non-collapsible flexible sealing membrane. Such seal a seal may be referred to as a "non-pusher secondary seal" (NPSS) herein. The outboard side seal can also be an NPSS and is typically shown as one in the below description, but other types of seal could conceivable be used. In one embodiment, by employing an NPSS as the chamber side seal can handle large pressure reversals where the inner diameter pressure (pressure in the chamber) spikes and exceeds the outer diameter pressure that is provided between the two seals forming the double seal. In prior art pusher seals, such reversals could cause damage seal components and/or allow for leaks. It is believed that the present disclosure provides a system that can avoid such issues due to rolling of the non-collapsible flexible sealing membrane. This allows for failure to be contained at the seal faces and such a failure can be repaired simply by replacing the seal faces/rings rather than the entire seal and without having fluid escape through the seal.

In one embodiment, a double seal adapted for arrangement around a rotating shaft of a pump is disclosed. The double seal is arranged in the pump so that a barrier liquid chamber is defined between an outer diameter of the double seal and a body of the pump. The double includes a first seal that includes: a first primary ring and a first mating ring, the first primary ring being axially shiftable relative to the rotating shaft and the first mating ring being axially fixable relative to the rotating shaft; a first biasing mechanism that urges the first primary ring axially outward from the machine toward the first mating ring, the first biasing mechanism including an annular carrier, a axially shiftable annular retainer that carries the first primary ring and a plurality of radially spaced spring members arranged between the annular carrier and the annular retainer; and a first annular flexible sealing membrane. The first annular flexible sealing membrane includes a first flange portion disposed at least partially between the first biasing mechanism and the first primary ring; a first coaxial portion that is axially fixable relative to the shaft; and a first flexible connection portion positioned within a radially inward extent of the first flange portion and connecting the first flange portion to the first coaxial portion. The first seal also includes a stub sleeve that supports the first coaxial portion, and wherein, when the pressure in the barrier liquid chamber is greater than a pressure on a back side of the annular carrier, a gap exists between the annular carrier and the axially shiftable annular retainer. When the pressure in the barrier liquid chamber is below the pressure on the back side of the annular carrier, the gap closes and the annular carrier and the axially shiftable annular retainer and the first primary ring and first mating ring are driven into contact.

The double seal also includes a second seal in fluid communication with the containment cavity that includes: a second primary ring and a second mating ring, the second primary ring being axially shiftable relative to the rotating shaft and the second mating ring being axially fixable relative to the rotating shaft; a second biasing mechanism that urges the second primary ring toward the second mating ring; and a second annular flexible sealing membrane. The second annular flexible sealing membrane includes: a second flange portion disposed at least partially between the second biasing mechanism and the second primary ring; a second coaxial portion that is axially fixable relative to the shaft; and a second flexible connection portion positioned within a radially inward extent of the second flange portion and connecting the second flange portion to the second coaxial portion.

In any prior embodiment, the stub sleeve can shift outwardly from the pump when the pressure in the barrier liquid chamber is below the pressure on the back side of the annular carrier.

In any prior embodiment, the stub sleeve is axially fixed to the annular carrier by a snap ring.

In any prior embodiment, wherein, after the pressure in the barrier liquid chamber fallen below and then rises above the pressure on the back side of the annular carrier, the gap reopens and the annular carrier moves inboard toward the pump.

In any prior embodiment, wherein the stub sleeve can shift inwardly from the pump when the pressure in the barrier liquid chamber returns to being above the pressure on the back side of the annular carrier.

In any prior embodiment, the stub sleeve can be axially fixed to the annular carrier by a snap ring.

In any prior embodiment, the double seal can be at least partially disposed in the pump.

In any prior embodiment, in operation, axial translation of the rotating shaft relative to the second biasing mechanism urges the second flange portion to shift axially inboard and radially inward relative to the second coaxial portion.

In any prior embodiment, in operation, axial translation of the rotating shaft relative to the second biasing mechanism urges the second flange portion to shift axially outboard and radially outward relative to the second coaxial portion.

In any prior embodiment, the second flexible connecting portion presents a thinner cross section than the second flange portion and the second coaxial portion.

In any prior embodiment, the seal can further comprise an anti-extrusion ring receivable within a groove of the first axially shiftable seal ring.

In any prior embodiment, the seal can further comprise a rotating sleeve operably coupled to the rotating shaft for rotation therewith and wherein the first and second axially fixed seal rings are operably coupled to the rotating sleeve.

In any prior embodiment the first and second sealing membranes comprises a flexible elastomer.

In any prior embodiment, any stub sleeve includes a first outer diameter, a second outer diameter and an angled surface connecting the first outer diameter to the second outer diameter, wherein the second outer diameter is greater than the first outer diameter.

In any prior embodiment, the first outer diameter of the stub sleeve abuts the coaxial portion, the angled surface abuts the angular facet of the flexible connection portion, and the second outer diameter abuts the axially shiftable first seal ring.

In any prior embodiment any prior flexible connection portion includes an angular facet that extends from the flange portion in an axial outward direction and that forms an angle $\phi$ with the coaxial portion, wherein the angle $\phi$ is between 100° and 150°.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the terms "coupled", "connected" and variations thereof describes having a path for a fluid between two elements and does not imply a direct connection between the elements with no intervening elements/connections between them. However, all connections or couplings can be direct if specifically called out the claims and all instances of such connections/connections can include the description that the connection/coupling (or similar terms) are direct. All of these variations are considered a part of the specification.

DETAILED DESCRIPTION

A detailed description of one or more embodiments of the disclosed apparatus and method are presented herein by way of exemplification and not limitation with reference to the Figures.

Turning now to an overview of technologies that are more specifically relevant to aspects of the invention a seal is disclosed that can be as a seal for any machine that includes a rotating shaft. Example of such machines include pumps, mixers, blenders, agitators, compressors, blowers, fans or the like.

Figure 1:
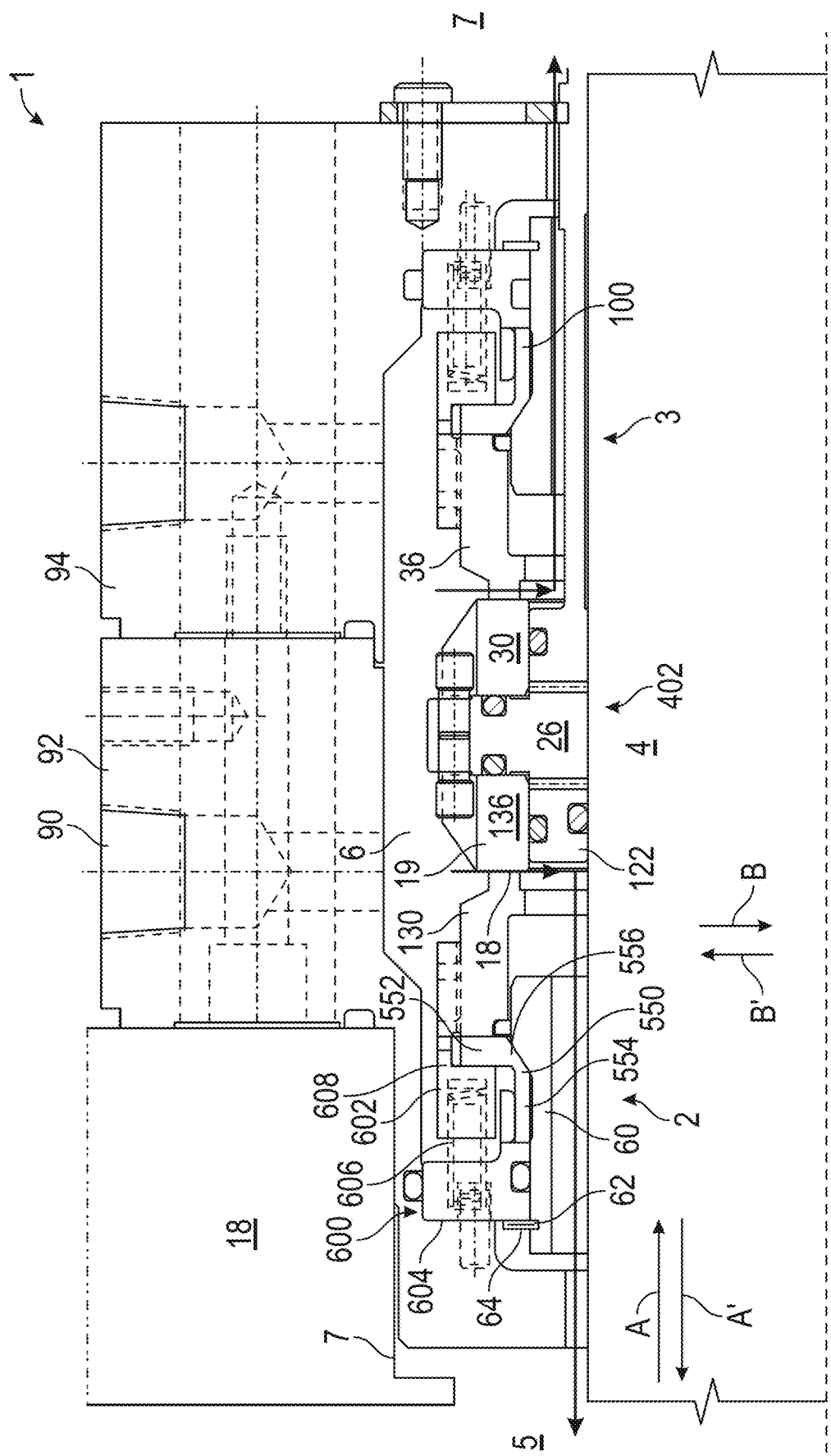
FIG. 1 is a cross-sectional view that identifies various portions of a double seal according to one embodiment.

With reference to FIG. 1, a double seal 1 according to one embodiment is illustrated. The seal 1 can be referred to as a mechanical seal assembly from time to time herein.

The mechanical seal assembly includes first and second seals, 2, 3. As shown, a first seal 2 is arranged so that it located inboard for the second seal 3 of FIG. 1. The terms first and second can be replaced with terms primary and containment or back-up, respectively. It shall be understood that include instances the first and second seals can the same or similar to one another. As illustrated in FIG. 1, the first and second seals 2, 3 are arranged in configuration to form a double seal. As more fully described below, because the primary rings of the first and second seals 2, 3 are urged towards each other (and towards mating ring holder disposed between them), the seal assembly 1 can be referred to as a double face-to-face seal.

The seal 1 is arranged such that is surrounds a rotating shaft 4 and seals a fluid (e.g., a hydrocarbon) in a process chamber 5 so that is does not escape and possibly enter the atmosphere 7.

From time to time certain directions will be used herein. An outboard direction is the direction extending in the direction of arrow A and the inboard direction (e.g., towards the chamber 5 described below) is in the opposite direction as indicated by arrow A'. The radially inward direction is in the direction of arrow B which is directed toward a center of the shaft 4 and the radially outward direction is in the opposite direction as indicated by arrow B'. Further, the fluid that has not yet entered the pump (or before it is expelled therefrom) may be referred to as "upstream" of the pump and fluid that has left the pump is "downstream" of the pump.

In the case where the chamber is defined in a pump, fluid in chamber 5 is pumped through the pump due to rotation of the shaft 4. In more detail, the shaft 4 will turn elements such as impellers attached thereto and create an operational pressure in the chamber 4. During normal operation, such pressure is within predetermined range and shall be referred to as a normal chamber pressure herein. In some cases, however, that pressure can increase above the normal chamber pressure. Embodiments herein can provide a seal that can handle such pressure increases without destroying the seal and keeping the fluid in the chamber 4. That is, to the extent the seal 1 fails or operates less than perfectly, the seal 1 will still achieve its desired purpose.

In general operation, the seal 1 in a positive pressure scenario. In such a scenario (and more fully described below), a barrier fluid provided into a barrier fluid chamber 7 defined on the outer diameter of the first and second seals 2, 3. An example of such a barrier fluid is Royal Purple 22. The barrier fluid typically at a pressure that is higher than the normal chamber pressure. As such, during normal operation, the barrier fluid will flow in the directions shown by the un-labeled arrows in FIG. 1.

In more detail, in operation, the barrier fluid flows from an outside diameter (OD) of the seals 2, 3 toward an inner diameter (ID) of the seals 2, 3. The OD of both seals is exposed to the pressure in the barrier fluid chamber 7. The ID of the first seal 2 is exposed to the pressure in the chamber 4 and the ID of the second seal is exposed to atmosphere, for example. As long as the pressure in the barrier chamber 7 is greater than the pressure in the chamber 4 or atmosphere, the barrier fluid will serve to lubricate the seal faces of the first and second seal 2, 3.

The illustrated first seal 2 includes two rings 130, 136 having opposing faces 18, 19 that rotate relative to one another in operation. The rings 130, 136 may be referred to, respectively, as mating and primary rings herein. The first seal 2 operates in normal conditions in the same manner as the second seal 3 more fully described below.

In general, during operation a liquid film develops between the faces 18, 19 as the faces rotate relative to one another. The rotation is caused by rotation of the shaft 4. The mating ring 136 is connected to the shaft 4 by a mating assembly 402. Relative to first seal 2, the mating assembly 402 includes an annular member 122 fixedly attached to the shaft 4 that rotates therewith. In the example shown in FIG. 1, regarding the primary seal 2, the mating ring 136 is carried on the annular member 122. An annular flange formation 26 extends radially outwardly of the sleeve member 122. The annular flange formation 26 as discussed below will also connect to the sleeve member 22 of the second seal 3. The flange formation 26 can, thus, help to anchor the mating rings both the first and second seals 2, 3. In operation, as the shaft moves axially forward and backward along arrows A and A', the flange formation 26 (and thus both mating rings) will track such motion.

The primary ring 130 of the first seal 2 is carried by a first seal carrier ring 92 that, in operation, can be fixedly attached to the annular housing 18. In this example, a primary or first seal biasing mechanism 600 urges the primary and mating rings 130, 136 of the primary seal together. In particular, the primary or first seal biasing mechanism 600 is connected to the primary ring 130 and urges is towards the mating ring 136. Of course, this configuration could be reversed without departing from the teachings herein.

The seal 2 also includes a non-collapsible flexible sealing membrane 550. How that element is arranged is generally the same as the more detailed description of the corresponding membrane in the second seal 3 below. In general, the non-collapsible flexible sealing membrane 550 can present a generally L-shaped cross-section, comprising a first, generally radially outward extending, flange portion 552 and a second, generally axially outboard extending, coaxial portion 554. The flange portion 552 and the coaxial portion 554 can be operably coupled by a flexible connecting portion 556. An outboard face of the flange portion 552 can abut and outboard face of axially shiftable (mating) seal ring 130, creating a pressure tight seal The biasing mechanism 600 can comprise an axially shiftable annular retainer 602, the axially fixed carrier 604, and one or more biasing members 606 spanning therebetween. The retainer 602 can be arranged proximate flange portion 552. The retainer 602 can present a protrusion 608, extending axially outboard outside the outer diameter of the flange portion 102. The protrusion 608 can be radially spaced from the outer face of the flange portion 552. The carrier 604 can be axially and rotationally fixed to the carrier ring 92 by one or more pins, though other fixation mechanisms can be used. The biasing members 606 can comprise one or more radially spaced springs, though other biasing mechanisms known in the art can be used. In embodiments, one or both of the retainer 602 and the carrier 604 504 can include bores adapted to house at least part of each biasing member 606, such that biasing members 606 are partially located within retainer 602 and carrier 604.

The biasing mechanism 600 can abut the flange portion 552. The flange portion 552 is located between the biasing mechanism 600 and the primary ring 130. Thus, the biasing mechanism 600 urges the seal faces 18, 19 together an also allows for the seal face 18 of the primary ring 130 to follow movement of the mating ring 136 due to axial motion of the shaft 4.

As shown, a inlet 90 is provided through the carrier ring 92. A pump or other pressure creating device, drives a barrier fluid in to the barrier fluid chamber 6 through this inlet 90. This will create a generally static pressure in the barrier fluid chamber 6 that, in typical operation, is higher than the pressure in the chamber 5 as well as higher than pressure in the atmosphere 7.

The liquid is received from the barrier fluid chamber 6 as is generally held at the OD of the first seal 2 where the faces 18/19 meet. Of course, some of the liquid may enter the process chamber 5 during normal operation. Importantly, the first seal 2 includes the non-collapsible flexible sealing membrane shown as the annular flexible sealing membrane 550. The annular flexible sealing membrane 550 not only serves to allow the seal to operate as generally described above, it can allow the seal 2 to keep fluid in the chamber 5 in the case of reversal.

A stub sleeve 60 is provide that is supports the member 550 in the same manner as the stub sleeve 200 more fully described below. The stub sleeve 60 can present groove 62 to receive snap ring 64 to locate stub sleeve axially relative to a carrier 604.

Figure 2:
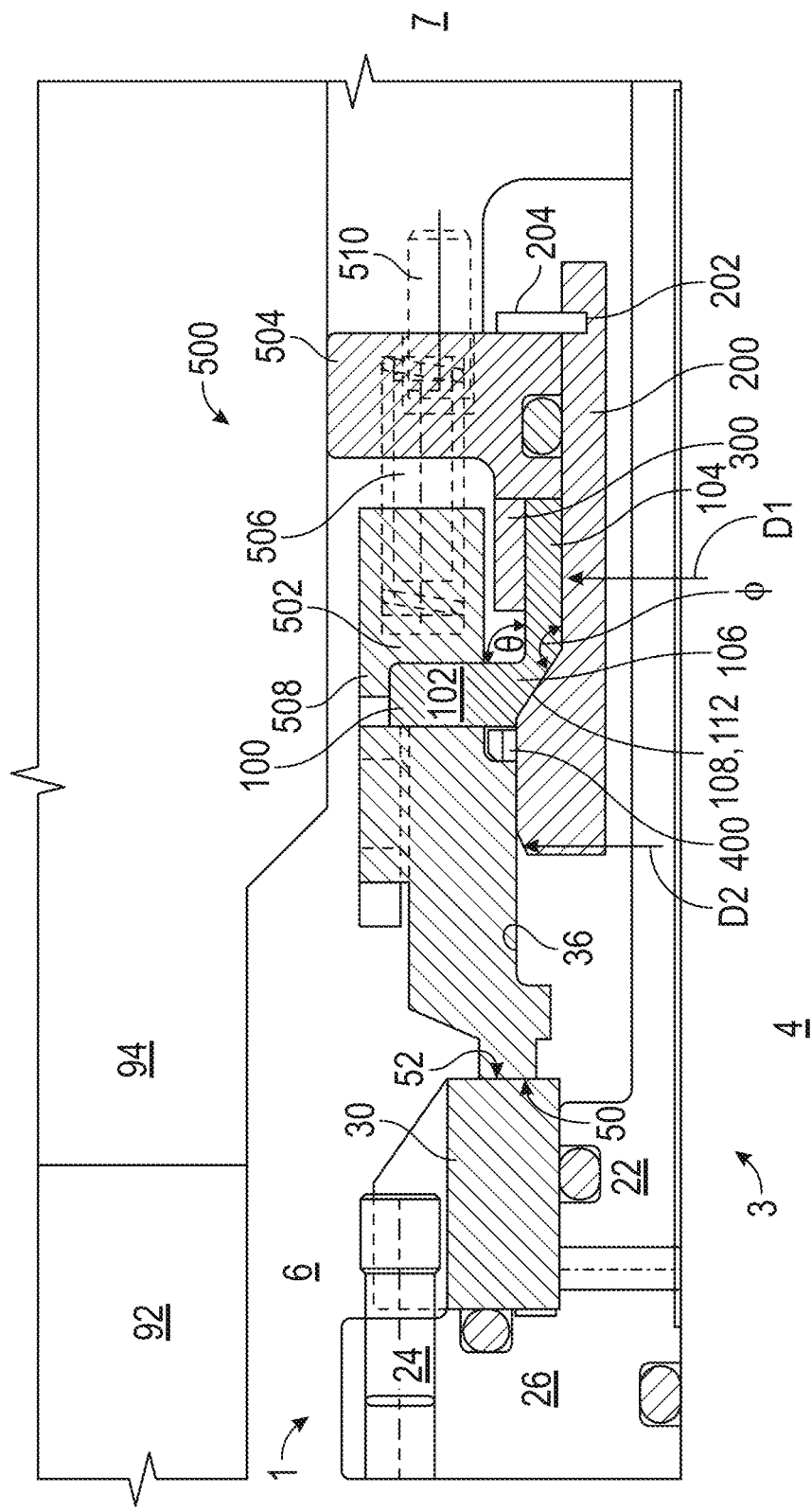
FIG. 2 is the same cross-sectional view that identifies additional portions of the seal and how it operates and is applicable to the first seal as well.

With reference now to FIG. 2, a more detailed version of the second seal 3 is illustrated. In FIG. 2, the barrier fluid will exit the seal and escape to atmosphere. The second seal can be connected to second or containment seal carrier 94. That carrier is connected to first seal carrier ring 92. It shall be understood that the description of second seal 3 also applies to the first seal. For example, non-collapsible flexible sealing membrane 550 of the first seal 2 can have the portions, alignment and operation as the non-collapsible flexible sealing membrane 100 of FIG. 2.

FIG. 2 is cross-sectional views depicting a portion of a seal assembly 1 including the second seal 3. Similar to the above, the second seal 3 includes a flexible, non-collapsible, sealing membrane 100 depicted in conjunction with an article of rotary shaft equipment such as a pump, mixer, blender, agitator, compressor, blower, fan, or the like, according to an embodiment of the present disclosure.

As is common for seal assemblies of this type, second seal 3 can seal a rotating, axially extending, shaft 4 of an article of rotary shaft equipment. As configured, the second seal 3 can provide a seal for the barrier fluid chamber 6 at the inboard extent of the seal 3 with respect to the ambient surroundings 7.

The seal assembly 1 can be arranged coaxial of the shaft 4 in a bore defined by an annular housing 18 coaxial of shaft 4 as shown in FIG. 1. Various stationary (or non-rotating) components of seal 3 can be operably coupled to carrier 94 that is in turn also operably coupled to housing 18.

Various rotating components can be operably coupled to shaft 4, for rotation therewith. An annular sleeve member 22 is secured to the shaft 4 for rotation therewith. The annular flange formation 26 extends radially outwardly of the sleeve member 22 at an inboard end thereof. A plurality of annularly spaced pins 24 can extend axially through bores in sleeve flange 26.

An axially fixed seal ring 30 (or mating ring) is mounted on the face of sleeve flange 26, for rotation therewith. Annular O-ring 32 provides a resilient secondary seal between sleeve member 22 and axially fixed seal ring 30. In embodiments, more or fewer secondary sealing O-rings may be present. Axially fixed seal ring 30 includes outboard sealing face 50.

An axially shiftable seal ring 36 (or primary ring) is arranged outboard and adjacent to axially fixed seal ring 30. The axially shiftable seal ring 36 includes an inboard sealing face 52.

While, as depicted and described, the axially shiftable seal ring 36 is stationary and the axially fixed seal ring 30 is rotatable, in embodiments, the relative axial movement can be provided by either the rotating or stationary seal ring.

As discussed above, a passage through one of carriers 92/94 can be defined to provide a sealing lubricant (or barrier liquid) to sealing faces 50 and 52.

The sealing membrane 100 can present a generally L-shaped cross-section, comprising a first, generally radially outward extending, flange portion 102 and a second, generally axially outboard extending, coaxial portion 104. The flange portion 102 and the coaxial portion 104 can be operably coupled by a flexible connecting portion 106. An inboard face of the flange portion 102 can abut and outboard face of axially shiftable seal ring 36, creating a pressure tight seal. The coaxial portion 104 is substantially or entirely radially inward of the balance diameter of the seal, where the pressure differential across the seal is the greatest. The flexible connecting portion 106 can present an angular facet 108 at a radially inward side and a connecting angle θ between flange portion 102 and coaxial portion 104 at a radially outward side. In embodiments, angle θ can be approximately ninety degrees, though other angles may also be used. The flexible connecting portion 106 can present a thinner cross section than flange portion 102 or coaxial portion 104 to enable stretching and compression.

The angular facet 108 can terminate at a corner 110 at a radially inward extent of the flexible connecting portion 106. The facet 108 can present an angle φ, relative to the axial axis of between about 100° to about 150°. The sealing member 100 is non-collapsible and can comprise a flexible material. Example flexible materials include elastomers such as nitrile, fluroreslastomer, and ethylene propylene rubbers, though other materials can be used.

The coaxial portion 104 can be fixed to an annular stub sleeve 200 by an annular band 300. The stub sleeve 200 has a first outer diameter D1, a second outer diameter D2 and an angled surface 112 connecting the first outer diameter to the second outer diameter. D2 is greater than D1. Radially outward directed faces (D1, angled surface 112 and D2) of stub sleeve 200 can abut coaxial portion 104, facet 108, and axially shiftable seal ring 36, respectively. In this manner, if the event of a pressure spike, the stub sleeve 200 provides a rigid support for the annular flexible sealing membrane 200 so that it is does not collapse in the manner of a convoluted elastomer as described above.

The stub sleeve 200 can present groove 202 to receive snap ring 204 to locate stub sleeve axially relative to a carrier 504 (discussed below). The carrier 504 can be attached, for example, to the containment seal carrier 94 of FIG. 1. In embodiments, the stub sleeve 200 can be located radially by a snap ring 204, hydraulic pressure, or interference fit with the carrier 504 (discussed below) or other components of seal assembly 1. The stub sleeve 200, band 300, and the snap ring 204 can comprise steel or stainless steel in embodiments.

The annular anti-extrusion ring 400 can be present in an annular groove of axially shiftable seal ring 36 and abut axially shiftable seal ring 36, stub sleeve 200, and sealing member 100. The annular anti-extrusion ring 400 can comprise a harder elastomer than sealing membrane 100, such as a 50 to 55 (Shore D) durometer carbon filled polytetrafluoroethylene (PTFE). Because extrusion is most likely at the balance diameter of the seal, the inner diameter of anti-extrusion ring 400 can be arranged at the balance diameter of the seal. As discussed above, in some embodiments, this ring can be omitted. An example of such an embodiment is shown in FIG. 1 by containment seal 3.

The biasing mechanism 500 can abut the flange portion 102. The biasing mechanism 500 can comprise an axially shiftable annular retainer 502, the axially fixed carrier 504, and one or more biasing members 506 spanning therebetween. The retainer 502 can be arranged proximate flange portion 102. The retainer 504 can present a protrusion 508, extending axially inboard outside the outer diameter of the flange portion 102. The protrusion 508 can be radially spaced from the outer face of the flange portion 102. The carrier 504 can be axially and rotationally fixed to the carrier 94 by one or more pins 510, though other fixation mechanisms can be used. The biasing members 506 can comprise one or more radially spaced springs, though other biasing mechanisms known in the art can be used. In embodiments, one or both of the retainer 502 and the carrier 504 can include bores adapted to house at least part of each biasing member 506, such that biasing members 506 are partially located within retainer 502 and carrier 504.

Those of ordinary skill in the art will appreciate that the arrangements depicted in FIGS. 1 and 2 include components that may be altered or eliminated in other seal assembly embodiments. In addition, more or fewer components may be incorporated in other embodiments of seal assemblies according to the present disclosure.

In operation, rotation of shaft 4 can drive sleeve member 22 and axially fixed seal ring 30 to rotate relative to axially shiftable seal ring 36. seal lubricant can be provided to seal 3 through from the chamber 6 to lubricate seal sealing faces 50 and 52 and to create a pressure gradient across sealing faces 50 and 52.

The pressure gradient and hydraulic pressure created by the relative rotation of sealing faces 50 and 52 can resulting in an opening force, urging axially shiftable seal ring 36 axially outboard from axially fixed seal ring 30. Similarly, a closing force can be provided by biasing mechanism 500, urging axially shiftable seal ring 36 inboard toward axially fixed seal ring 30.

The closing force at a seal face interface can be calculated from the closing area (AC), the opening area (AO), the outer diameter of the stationary ring face (OD), the inner diameter of the stationary ring face (ID) and the balance diameter (BD), as detailed below:

$$\text{Closing Force} = \left(\frac{AC}{AO}\right) \times \text{Hydraulic Pressure}$$

$$\text{where } AC = \frac{OD^2 - BD^2}{OD^2 - ID^2}$$

Flange portion 102 can shift axially and radially based on the relative closing and opening forces, and the axial translation of the shaft itself, such that the closing force applied to axially shiftable seal ring 36 is constant, regardless of the position of flange portion 102.

Figure 3A:
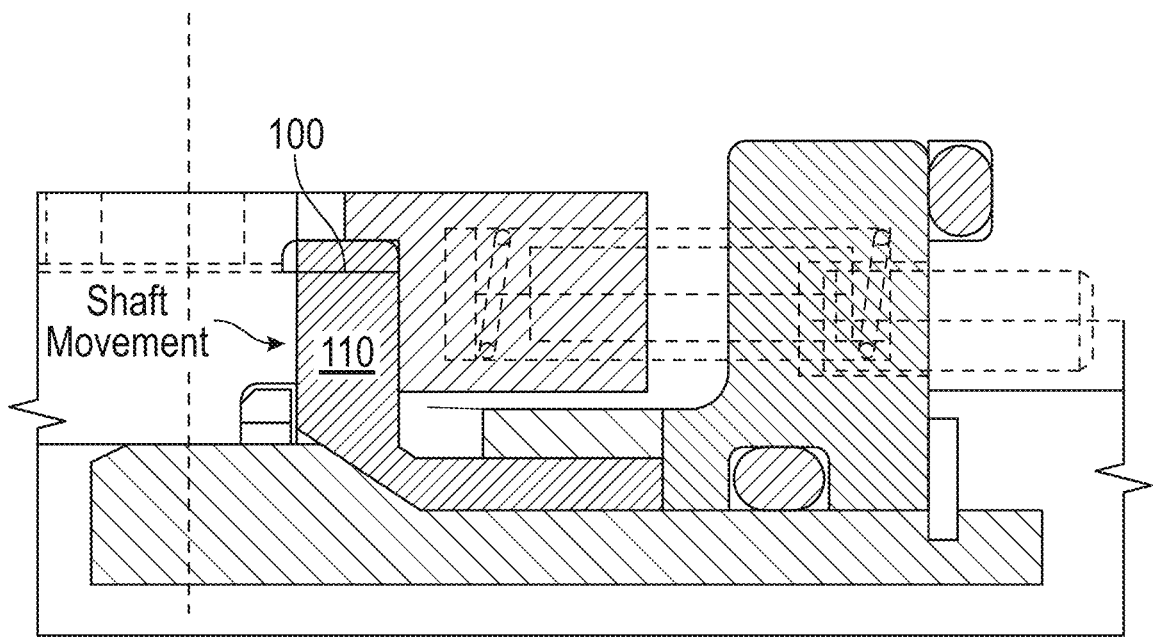
FIGS. 3A and 3B shows a cross section of a portion of the seal assembly of FIG. 2 as the shaft moves.
Figure 3B:
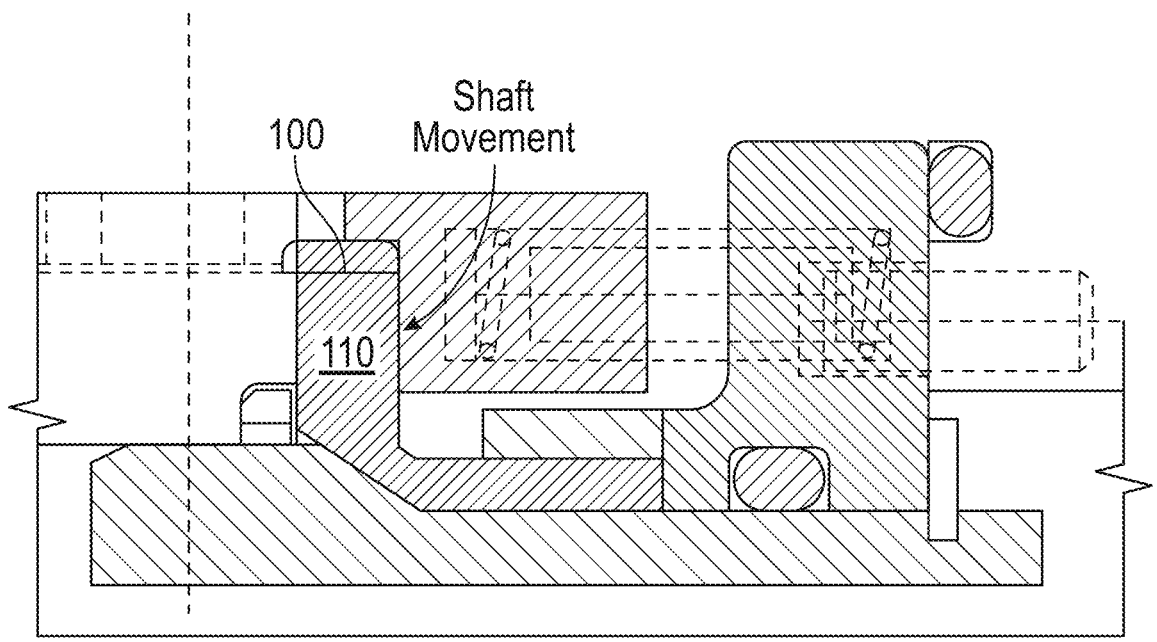
Figure 4:
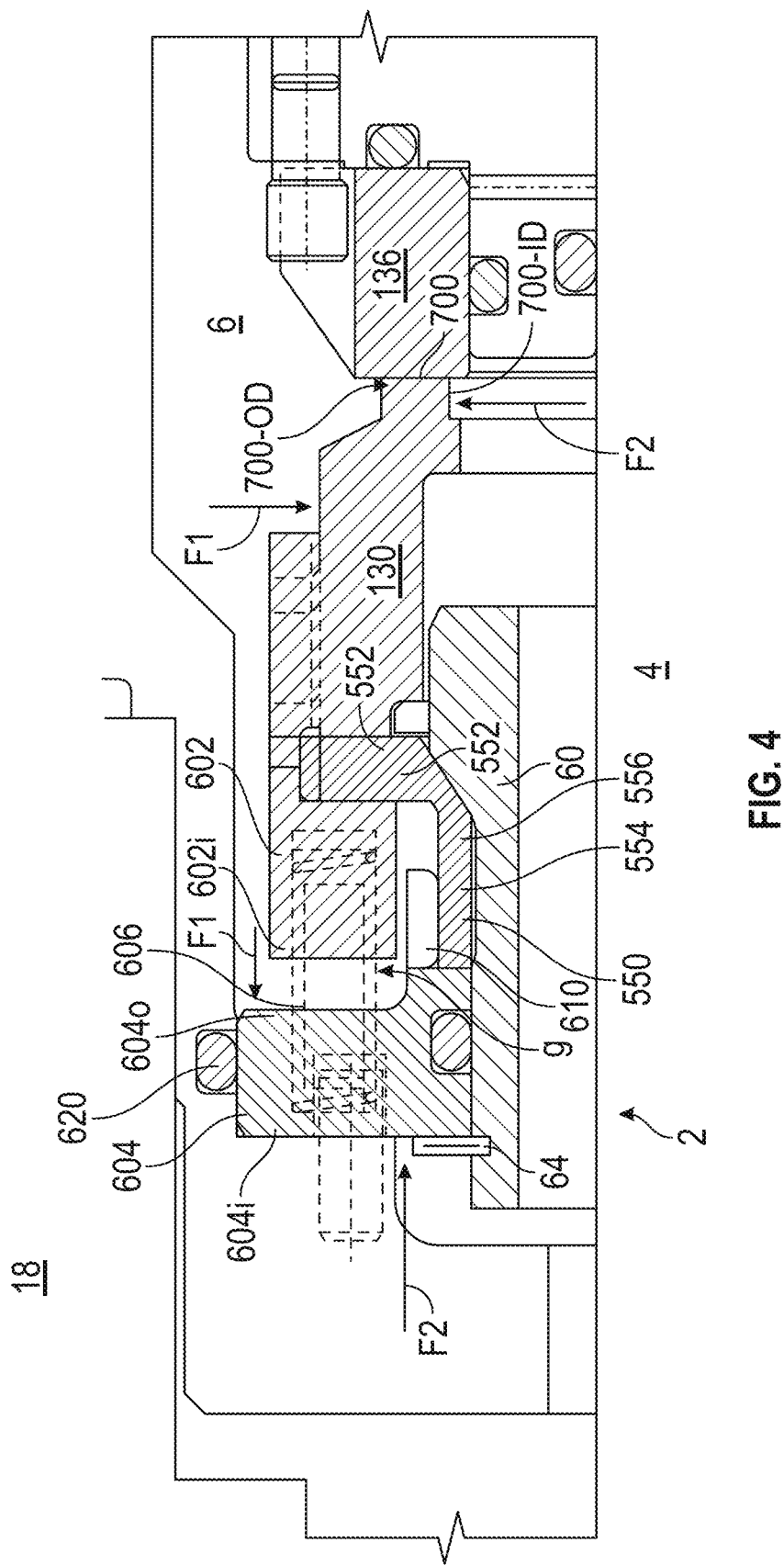
FIG. 4 is a cross-sectional view depicting a portion of the first seal operating under pressure conditions.

FIGS. 3A and 3B are detail views of an embodiment of a seal assembly, in which some effects of axial movement on sealing membrane 100 can be seen. An axially outward translation of the shaft can be transmitted to the flange portion 102 via sleeve 22, axially fixed ring 30, and axially shiftable seal ring 36. This movement can cause the flange portion 102 to compress slightly and distort at an angle, preventing any changes in the opening and closing forces at the seal interface. In particular, as depicted, axially outboard translation of the axially shiftable seal ring 36 can transmit the opening force to the flange portion 102, causing flange portion 102 to be translated axially outboard and radially outward away from the stub sleeve 200 as depicted in FIG. 4A. Conversely, an axially inward translation of the shaft 4 can relieve pressure on the flange portion 102, enabling the flange portion 102 to translate axially inboard and radially inward against the stub sleeve 200. This contact between sealing membrane and stub sleeve 200 can further minimize leakage.

A high pressure gradient across sealing faces 50 and 52 can encourage partial extrusion of flexible sealing membrane 100 between stub sleeve 200 and axially shiftable seal ring 36. This can be resisted by the harder material of anti-extrusion ring 400.

When used without having a face with grooves (e.g., as a primary seal 2 above), over the life of the seal, sealing faces 50 and 52 will wear relative to each other. Because sealing membrane 100 can move inboard (direction A') and outward or outboard (direction A') over the life of the seal, it can help to maintain an appropriate seal gap. Hydraulic pressure can keep the axially shiftable seal ring 36 from contacting axially fixed seal ring 30 while the flange portion 102 of sealing membrane 100 moves inboard. The hydraulic pressure can keep the other components, such as stub sleeve 200, in place. Further, because the coaxial portion 104 is below the balance diameter of the seal, the hydraulic pressure applied to coaxial portion 104 will not affect the closing force, or the balance diameter itself. Biasing mechanism 500 can be used to set the working height of the seal and compress flange portion 102 of sealing membrane 100 against an end of the axially shiftable seal ring 36 (distal in relation to the process chamber, and opposite sealing face 52) of the axially shiftable seal ring 36 (creating a seal) when no hydraulic pressure is present. Because the vertical force is not altered by the axial movement of sealing membrane 100, and the closing force at the interface of sealing faces 50 and 52 is not affected.

The maximum axially outboard translation of flange portion 102 and retainer 502 can be defined by a gap provided between an outboard face of retainer 502 and an inboard face of carrier 504, or by the compression limit of biasing members 506. In embodiments, translation of flange portion 102 can be limited to prevent bunching, folding over, or other collapsing of sealing member 100 at connecting portion 106. In one embodiment, translation of flange portion 102 can be limited to maintain angles θ or φ.

In addition, because flange portion 102 is held in a radially extending orientation by axially shiftable seal ring 36 and retainer 502, coaxial portion 104 is held in an axially extending orientation by stub sleeve 200 and band 300, sealing member 100 is non-collapsible.

Having described how the seal assembly 1 works generally related to second seal 3 it shall be understood that first seal 2 operates in the same manner but that is orientation is reversed. With reference to FIG. 1 again, for example, the biasing member 600 will bias the primary ring 130 outboard away from the process chamber while the biasing mechanism 500 will bias the primary ring 36 inboard.

Now consider the situation where the pressure in the chamber 5 exceeds the pressure in the barrier fluid chamber 6. In such a case, the pressure on the back side of the axially fixed carrier 604 (e.g, the side contacting snap ring 64) will be greater than the pressure in the barrier fluid chamber 6. Also, the pressure at the ID on interface between the seal faces 18, 19 will be greater than at the OD of those seal faces. Standing alone, such a pressure deferential could lead to fluid from the chamber entering the barrier fluid chamber 6. This in turn could lead to leakage.

As mentioned above, however, such a rise pressure will also exert pressure on the back side of the axially fixed carrier 604. For more detailed discussion, reference in now made to FIGS. 4 and 5 to describe operation of the first seal 2 in a reverse pressure situation (i.e., pressure in chamber 5 is greater than pressure in barrier fluid chamber 6.

Similar to the above, during normal operation, the maximum axially inboard translation of flange portion 552 and retainer 602 can be defined by a gap (g) provided between an inboard face 602i of retainer 602 and an outboard face 604o of carrier 604, or by the compression limit of biasing members 606. During such normal operation, the primary and mating rings 130, 136 define a seal interface 700. The pressure at the outer diameter 700-OD of the seal interface 700 is typically greater than the pressure at the inner diameter 700-ID of the seal interface 700. In FIG. 4A the forces due to these pressures are indicated by forces F1 and F2. Similarly, the force acting on the outboard face 604o of the carrier 604 due the pressure in barrier fluid chamber 6 is F1 and that generally exceeds the pressure in chamber 5 exerted on the inboard face 604i of the carrier 604 (F2). This keeps the carrier 604 seated against the snap ring 64 and the flow of fluid is generally as in FIG. 1 from the outer diameter 700-OD of the seal interface 700, through the seal interface 700, and into the chamber 5.

If, however, the pressure in the chamber 5 rises such that F2 is greater than F1, the double seal 1 of FIG. 1 can still operate and keep fluid from the chamber 5 from traveling from the inner diameter 700-ID of the seal interface 700, through the seal interface 700 and into the barrier liquid chamber 6 and eventually into atmosphere 7.

When F2 is greater than F1 by a large amount (for example, over 50 psi) the portions of the first seal 2 can be driven outward so that seal interface 700 is driven closed and pressure between the primary and mating rings 130, 136 increases to keep fluid in. This is due, at least in part, to the configuration of the first seal 2 and, in particular, due to the utilization of the non-collapsible flexible sealing membrane 550.

Figure 5:
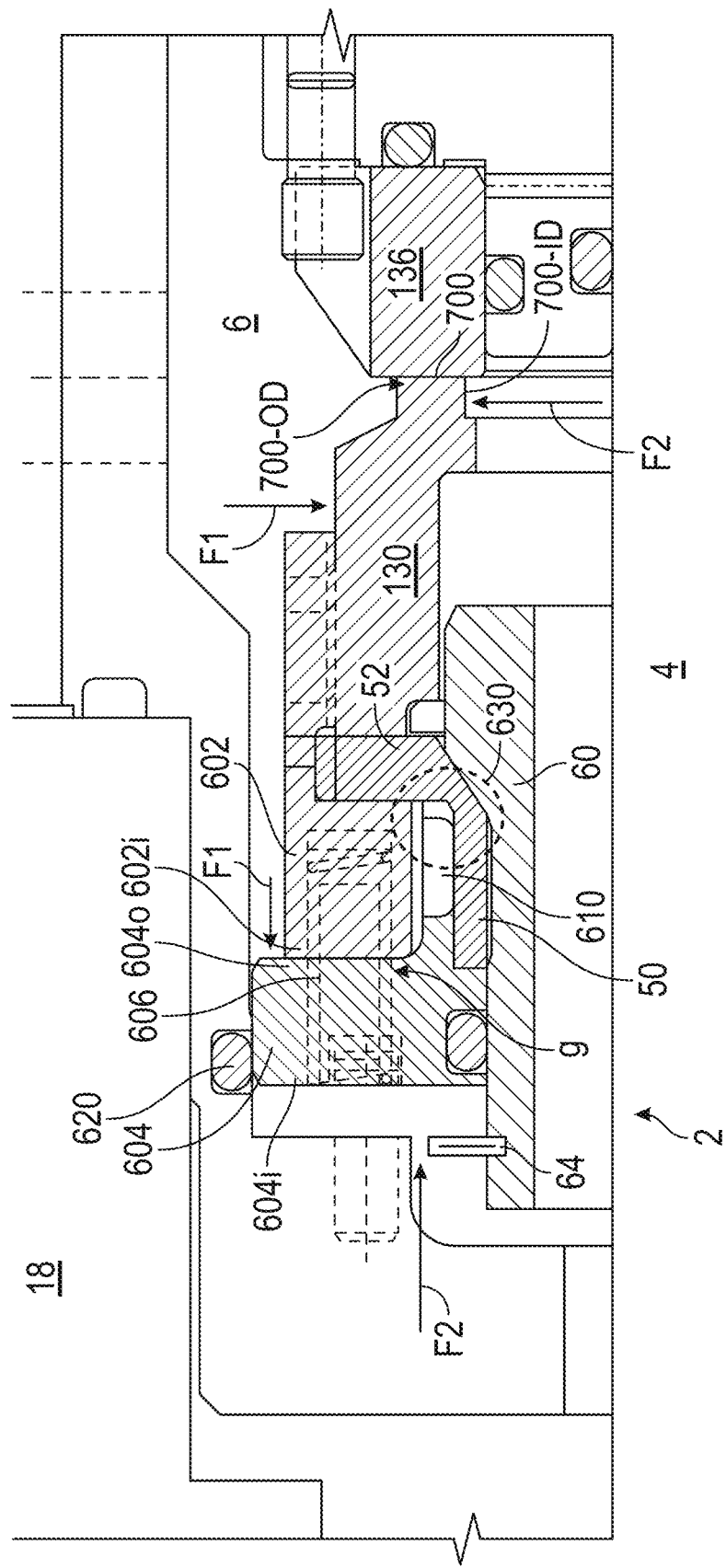
FIG. 5 is a cross-sectional view depicting a portion of the first seal operating under reverse conditions.

FIG. 5 illustrates motion of carrier 604 in cases where F2 is greater than F1. In particular, F2 drives the carrier 604 outboard. This motion of carrier 604 will compress the biasing member 606 until the gap g is closed such that the inboard face 602i of retainer 602 and the outboard face 604o of the carrier 604 contact one another. In turn, the pressure will drive faces of the primary and mating rings 130, 136 and close the seal interface 700 so that liquid does not travel through it.

In more detail, under reverse pressure (F2>F1), the carrier 604, the stub sleeve 60, the snap ring 64, the non-collapsible flexible sealing membrane 550 and the annular band 610 that affixes non-collapsible flexible sealing membrane 550 to the stub sleeve 60 all move towards the mating ring 136. The pressure boundary is maintained by the o-ring 620 disposed in the body and that contacts the top of the carrier 604. As the carrier moves outboard, it slides along the o-ring 620. Alternatively, the o-ring could be located in the carrier 604 and slide along the body 18.

The outboard face 604o of the carrier moves compressing the biasing members (springs) 606 until it makes contact with the inboard side 602i of the retainer 602. In the region identified by circle 630, the non-collapsible flexible sealing membrane 550 'folds' over to accommodate the movement. After the pressure reduces, the carrier 604, the stub sleeve 60, the snap ring 64, the non-collapsible flexible sealing membrane 550 and the annular band 610 that affixes non-collapsible flexible sealing membrane 550 to the stub sleeve 60 all move back to their normal positions due to the spring pressure. In short, the seal transitions back to the position shown in FIG. 4. In the above, it is assumed that F2 is greater than F1 by an amount of pressure required to compress the biasing members 606.

Figure 6:
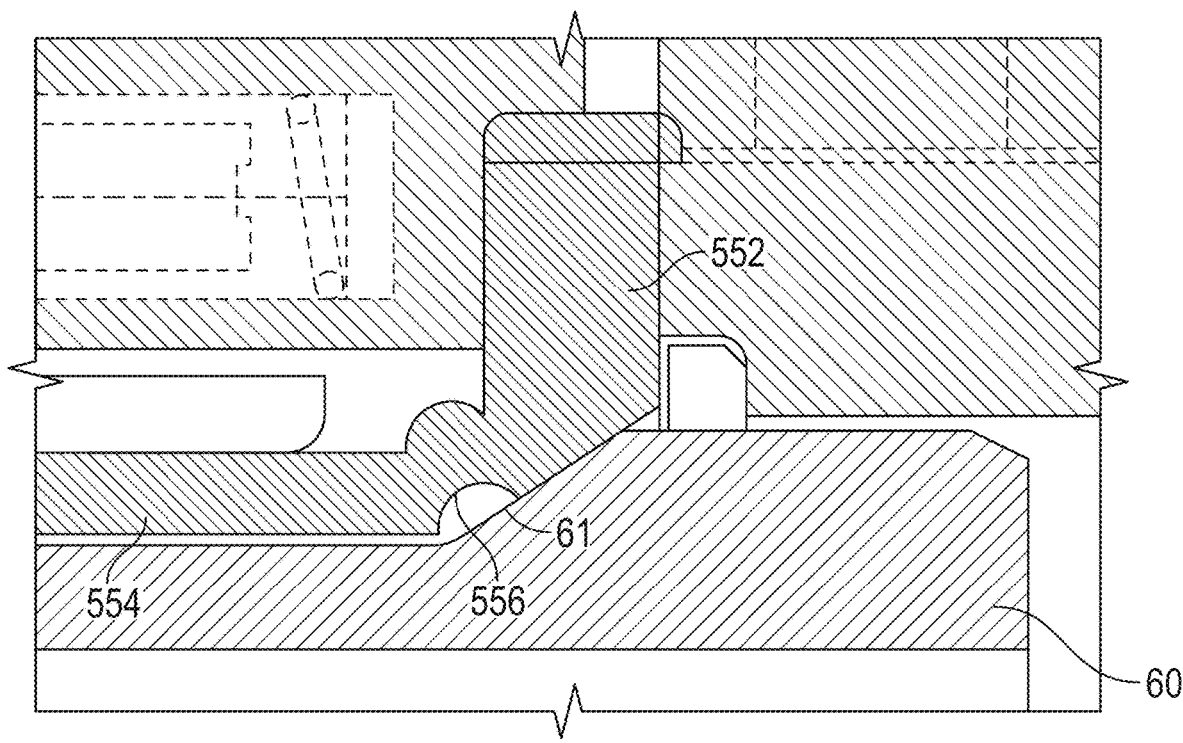
FIG. 6 shows one example of how the flexible member may be arranged when the conditions of FIG. 5.

FIG. 6 shows one example of the non-collapsible flexible sealing membrane 550 while in the configuration of FIG. 5. As illustrated, the non-collapsible flexible sealing membrane 550 has bowed or otherwise folded so that it has separated from the stub sleeve 60. In particular, the flexible connecting portion 556 have moved away (at least partially) from contacting the stub sleeve 60 and in particular, the facet 61 of the stub sleeve 60.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A double seal adapted for arrangement around a rotating shaft of a pump, wherein when the double seal is arranged in the pump so that a barrier liquid chamber is defined between an outer diameter of the double seal and a body of the pump, the double seal comprising:
  a first seal that includes:
    a first primary ring and a first mating ring, the first primary ring being axially shiftable relative to the rotating shaft and the first mating ring being axially fixable relative to the rotating shaft;
    a first biasing mechanism that urges the first primary ring axially outward from the machine toward the first mating ring, the first biasing mechanism including an annular carrier, a axially shiftable annular retainer that carries the first primary ring and a plurality of radially spaced spring members arranged between the annular carrier and the annular retainer; and
    a first annular flexible sealing membrane that includes:
      a first flange portion disposed at least partially between the first biasing mechanism and the first primary ring;

a first coaxial portion that is axially fixable relative to the shaft; and a first flexible connection portion positioned within a radially inward extent of the first flange portion and connecting the first flange portion to the first coaxial portion;

a stub sleeve that supports the first coaxial portion;

wherein, when the pressure in the barrier liquid chamber is greater than a pressure on a back side of the annular carrier, a gap exists between the annular carrier and the axially shiftable annular retainer;

wherein, when the pressure in the barrier liquid chamber is below the pressure on the back side of the annular carrier, that annular carrier moves outboard, the gap closes and the annular carrier and the axially shiftable annular retainer and the first primary ring and first mating ring are driven into contact;

a second seal in fluid communication with the containment cavity that includes:

a second primary ring and a second mating ring, the second primary ring being axially shiftable relative to the rotating shaft and the second mating ring being axially fixable relative to the rotating shaft;

a second biasing mechanism that urges the second primary ring toward the second mating ring; and a second annular flexible sealing membrane that includes:

a second flange portion disposed at least partially between the second biasing mechanism and the second primary ring;

a second coaxial portion that is axially fixable relative to the shaft; and a second flexible connection portion positioned within a radially inward extent of the second flange portion and connecting the second flange portion to the second coaxial portion.

2. The double seal of claim 1, wherein the stub sleeve shifts outwardly from the pump when the pressure in the barrier liquid chamber is below the pressure on the back side of the annular carrier.

3. The double seal of claim 2, wherein the stub sleeve is axially fixed to the annular carrier by a snap ring.

4. The double seal of claim 2, wherein the stub sleeve is axially fixed to the annular carrier by a snap ring.

5. The double seal of claim 1, wherein, after the pressure in the barrier liquid chamber fallen below and then rises above the pressure on the back side of the annular carrier, the gap reopens and the annular carrier moves inboard toward the pump.

6. The double seal of claim 1, wherein the stub sleeve shifts inwardly from the pump when the pressure in the barrier liquid chamber returns to being above the pressure on the back side of the annular carrier.

7. The double seal of claim 1, wherein the double seal is at least partially disposed in the pump.

8. The double seal of claim 1, wherein, in operation, axial translation of the rotating shaft relative to the second biasing mechanism urges the second flange portion to shift axially inboard and radially inward relative to the second coaxial portion.

9. The double seal of claim 1, wherein, in operation, axial translation of the rotating shaft relative to the second biasing mechanism urges the second flange portion to shift axially outboard and radially outward relative to the second coaxial portion.

10. The double seal of claim 1, wherein the second flexible connecting portion presents a thinner cross section than the second flange portion and the second coaxial portion.

11. The double seal of claim 1, further comprising an anti-extrusion ring receivable within a groove of the first axially shiftable seal ring.

12. The double seal of claim 1, further comprising a rotating sleeve operably coupled to the rotating shaft for rotation therewith and wherein the first and second axially fixed seal rings are operably coupled to the rotating sleeve.

13. The double seal of claim 1, wherein the first and second sealing membranes comprises a flexible elastomer.

14. The double seal of claim 1, wherein the stub sleeve includes a first outer diameter, a second outer diameter and an angled surface connecting the first outer diameter to the second outer diameter, wherein the second outer diameter is greater than the first outer diameter.

15. The double seal of claim 14, wherein the first outer diameter of the stub sleeve abuts the coaxial portion, the angled surface abuts the angular facet of the flexible connection portion, and the second outer diameter abuts the axially shiftable first seal ring.

16. The double seal of claim 1, wherein the second flexible connection portion includes an angular facet that extends from the second flange portion in an axial outward direction and that forms an angle $\phi$ with the second coaxial portion, wherein the angle $\phi$ is between 100° and 150°.

17. The double seal of claim 1, wherein the first flexible connection portion includes an angular facet that extends from the first flange portion in an axial inward direction and that forms an angle $\phi$ with the first coaxial portion, wherein the angle $\phi$ is between 100° and 150°.

* * * * *